United States Patent [19]

Mulyarchik et al.

[11] Patent Number: 5,780,518
[45] Date of Patent: Jul. 14, 1998

[54] PROCESSING WASTE RUBBER BY STEAM PYROLYSIS

[75] Inventors: **Valery Vladimirovich Mulyarchik;
Vladimir Nikolaevich Drozdov;
Anatoly Shzoresovich Grebenkov;
Gennady Ivanovich Shzuravsky;
Leonid Michailovich Vinogradov;
Valery Grigorjevich Konstantinov;
Anatoly Vasiljevich Kuharev.** all of Minsk, Belarus

[73] Assignee: Science-Technical and Product-Innovative Center "Tokema". Belarus

[21] Appl. No.: 500,850

[22] PCT Filed: Dec. 8, 1994

[86] PCT No.: PCT/BY94/00004

§ 371 Date: Aug. 4, 1995

§ 102(e) Date: Aug. 4, 1995

[87] PCT Pub. No.: WO95/15840

PCT Pub. Date: Jun. 15, 1995

[30] Foreign Application Priority Data

Dec. 9, 1993 [BY] Belarus .................................. 0104601

[51] Int. Cl.$^6$ ............................................. C08J 11/14
[52] U.S. Cl. ......................................... 521/45; 521/41
[58] Field of Search .................................... 521/4, 45

[56] References Cited

U.S. PATENT DOCUMENTS

| 25,160 | 8/1859 | Hall ..................................... 521/45 |
| 866,758 | 9/1907 | Wheeler et al. ..................... 521/45 |
| 4,707,248 | 11/1987 | Silva et al. ........................... 208/409 |

FOREIGN PATENT DOCUMENTS 0104601 12/1993 Belarus .

| 2254472 | 10/1976 | Germany . |
| 483270 | 12/1975 | U.S.S.R. . |
| 1678640 | 9/1991 | U.S.S.R. . |
| 1685721 | 10/1991 | U.S.S.R. . |
| 965177 | 7/1964 | United Kingdom ............ 521/45 |
| 1507138 | 4/1978 | United Kingdom . |

OTHER PUBLICATIONS

Palgunov, P.P. et al. Utilization of Industrial Waste. M. Stroyizdat pp. 165–166, 100, 1990.

Alexeyeu, G.M. et al. Industrial Methods of Sanitary Cleaning of Cities-L. Stroyizdat pp. 44–45, 14–15, 1983.

Grigoryev, V.A. et al. Theoretical Basis of Heat Engineering-Reference Book Energoizdat (1988) p. 373.

Petukhov, B.C. Reference Book on Heat Exchangers. Energoizdat, 1987, p. 211, Table 1.

Isachenko, V.P. et al. A.C. Heat Transmission, Engergoizdat, 1981 p. 401 table 3.

*Primary Examiner*—Robert E. Sellers
*Attorney, Agent, or Firm*—Ladas & Parry

[57] ABSTRACT

The invention relates to the technology of reprocessing industrial and domestic waste. The problem addressed is reducing energy consumption and the quantity of toxic waste which enters the environment when rubber waste is reprocessed. This problem is solved by the use of superheated steam for the pyrolysis of the waste material. Superheated steam, amounting to between 18 and 110 percent of the mass of the rubber waste, is used as the heat carrier. The gaseous products of pyrolysis are condensed together with the steam, and the condensate thus obtained is mixed with the solid residue which has first undergone preliminary grinding to produce particles of between 0.001 and 0.210 mm in size. The quantity of solid residue in the mixture is set at between 23 and 55.8 percent of the total mass of the mixture. This process results in the production of a liquid fuel with improved environmental characteristics.

1 Claim, 1 Drawing Sheet

PROCESSING WASTE RUBBER BY STEAM PYROLYSIS

FIELD OF THE INVENTION

This invention relates to the technology of processing industrial and domestic waste. It can be used in the rubber industry and in the fuel-power industry for use of waste rubber as a fuel.

BACKGROUND OF THE INVENTION

There exists a method of processing waste to obtain liquid and gaseous fuel by means of pyrolysis and decomposition of the products of pyrolysis into solid, liquid and gaseous phases. The solid phase is restored by water vapor with the formation of carbon monoxide and hydrogen; the gaseous phase is partially removed for maintaining the process of pyrolysis, and the remaining part is mixed with condensed and isolated from water resin (see Alexeyev G. M., Petrov V. N., Shpilfogel P. V. Industrial methods of sanitary cleaning of cities.-L. Stroyizdat, 1983, p. 14–15).

Disadvantages, associated with this method are the following: high power consumption as a result of high temperatures (up to 1500° C.) existing in the reactor; technical difficulties, arising in the process of isolation of resin from water; and great outflow of toxic substances into the surroundings.

The most similar to the invention is a method of processing waste rubber, taken as prototype, according to which pyrolysis of waste is carried out in the medium of heat carrier-arenaceous quartz; solid phase is isolated, liquid and gaseous phases are separated by condensation and the gaseous phase is removed and burnt for maintaining the process of pyrolysis (see Palgunov P. P. Sumarockov M. V. Utilization of Industrial Waste.-M. Stroyizdat, 1990, p. 165–166).

The disadvantages of this method are the following: high power consumption (specific heat consumption is 12.5 megajoules/kg); high temperature of the process (T=500°–700° C.) that makes it necessary to use special heat-resisting steels in pyrolysis plants; a large amount of combustion products introduced into the atmosphere (outflow of products of combustion is 2.5 kg/kg of the waste subjected to pyrolysis); great danger of explosion of gases of pyrolysis due to a large amount of hydrogen in them (hydrogen content in pyrolysis gas is 48–52%).

SUMMARY OF THE INVENTION

This invention is aimed at reducing power consumption and lowering the amount of harmful outflow into the surroundings during the process of obtaining fuel from waste rubber.

The aim is achieved by this method of processing waste rubber, including pyrolysis of waste in the medium of a heat carrier, isolation of solid phase, separation of liquid and gaseous phases by condensation and removing and burning of gaseous phase for maintaining the process of pyrolysis. Superheated water vapor is used as the heat carrier and the quantity of superheated water vapor is 18–110% of the mass of waste. The solid phase after separation is ground to particles of 0.001–0.210 mm, liquid phase is separated together with vapor and mixed with 23.0–55.8% of ground solid phase to obtain liquid fuel.

It is known (see Alexeyev G. M., Petrov V. N., Shpilfogel P. V. Industrial Methods of Sanitary Cleaning of Cities.-L. Stroyizdat, 1983, p.44–45), that the process of pyrolysis of waste rubber begins at T=400° C. and ends at T=500° C., therefore the temperature in the reactor must range from 400° to 500° C. For keeping such a temperature level in the reactor a certain amount of superheated water vapor is needed.

As waste rubber is heated by the warmth of the superheated water vapor, and the temperature of the superheated water vapor is in fact 100°–1600° C., then the maximum quantity of the superheated water vapor necessary for heating the waste to T=400°–500° C is 18–110% of the mass of the waste subject to pyrolysis.

If less than 18 mass percent of superheated water vapor is used, waste rubber will not be heated to T=400° C. (it will be heated to a lower temperature) and the process of pyrolysis will not occur.

If more than 110 mass percent of superheated water vapor is used waste rubber will be heated to more than 500° C. which will cause a decrease in the useful products of pyrolysis, increase the consumption of the heat carrier and increase the harmful gaseous outflow into the surroundings i.e. breaking the process of pyrolysis.

The degree of grinding of the solid remainder is based on the following: the smaller the diameter of the particles, the more homogeneous and stable. There may be the mixture of particles. However, the lower limit of the degree of grinding is determined by technical potentialities and is equal to 0.001 mm. The upper limit of grinding is determined by the stability limit of the mixture and is 0.210 mm in our case.

If particles with a diameter of more than 0.210 mm are used the mixture of particles condensate (liquid phase) will lose liquid mass stability, i.e. the particles will precipitate.

For preventing harmful outflow into the surroundings (pouring out of condensate), it is necessary to mix the whole condensate with solid phase. Thus, the content of the solid remainder in the mixture will be 23.0–55.8 mass percent.

Making a mixture with the content of solid remainder less than 23.0 mass percent results in the need to pour out a part of condensate into the surroundings, that results in pollution and loss of some useful products of pyrolysis of waste.

Making mixture with the content of solid reminder more than 55.8 mass percent, cause a part of the solid remainder to precipitate and as a result liquid mass stability of the mixture will be broken, hence the homogeneity of liquid fuel, i.e. the quality of the fuel (density, viscosity heat of combustion) will get much worse.

DETAILED DESCRIPTION OF THE INVENTION

Figure 1:
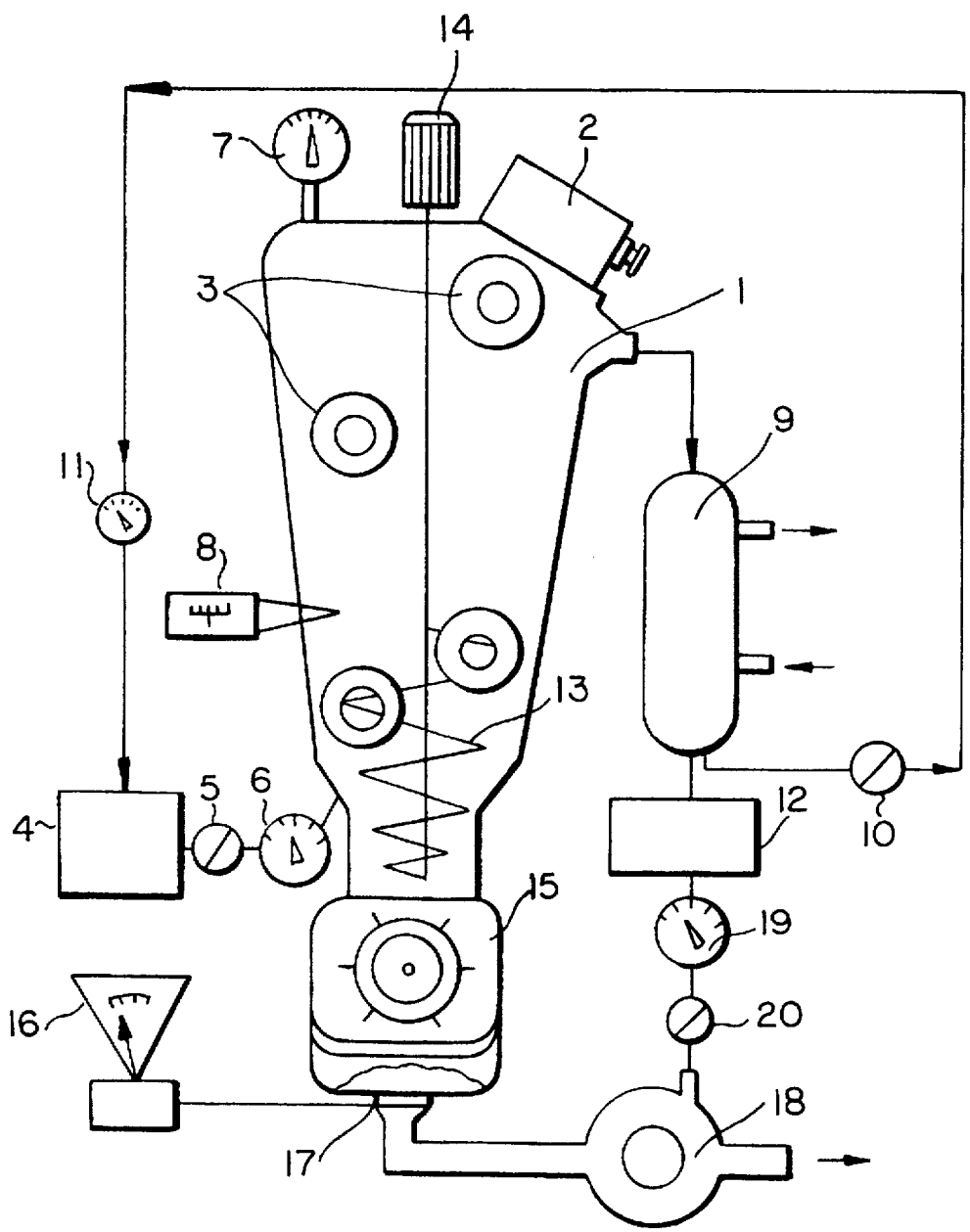
FIG. 1 is a plan view of the device for realization of the method of processing waste rubber.

The device has reactor 1 with lock hatch 2 for waste rubber 3. Steam generator 4 through tap 5 and consumption indicator 6 is connected to the reactor. Vapor pressure in the reactor is controlled by the indication of the manometer 7. The temperature in the reactor is controlled by the indication of thermometer 8.

Gases from reactor 1 go to condenser 9. Incondensable gases through tap 10 and consumption indicator 11 go to combustion chamber of steam generator 4. Condensed water vapor and the products of pyrolysis go from condenser 9 to storage chamber 12.

Screw 13, rotated by engine 14, transports solid remainder of pyrolysis of waste rubber to mill 15. After grinding solid remainder is transported to mixer 18 through weight doser 16 with lock 17. Through consumption indicator 19 and tap 20 condensate from storage chamber 12 goes to mixer 18.

DETAILED DESCRIPTION OF THE PREFERRED EMBODIMENT

According to the present invention waste rubber is processed as follows.

Waste rubber 3, for example rubber tires, are transported into reactor 1 through lock hatch 2. Simultaneously, water vapor having a temperature from 400° to 1600° C. goes from steam generator 4 to the reactor through tap 5 and consumption indicator 6. Vapor pressure in reactor 1 is controlled by indication of manometer 7. Superheated water vapor, going to the reactor, heats waste rubber up to the temperature at which pyrolysis of waste rubber occurs, resulting in isolation of solid and liquid constituents.

The temperature in the reactor is controlled by indication of thermometer 8.

At temperatures from 400° to 500° C. thermal decomposition of waste rubber occurs. The gases of decomposition together with water vapor go to condenser 9, where vapor and a portion of gaseous products of pyrolysis condense.

Incondensable gases through tap 10 and consumption indicator 11 are transported for burning to combustion chamber of steam generator 4.

Condensed water vapor and the products of pyrolysis go from condenser 9 to storage chamber 12.

Solid remainder of pyrolysis of waste rubber is transported by screw 13, rotated by engine 14 to mill 15 and is ground to particles with diameters of 0.001–0.210 mm. After grinding, the solid remainder is transported to mixer 18 through weight doser 16 with lock 17.

Simultaneously, condensate from storage chamber 12 is transported to mixer 18 through consumption indicator 19 and tap 20, the quantity of solid remainder in the mixture being 23–55.8% of the mass of the mixture.

Condensate and solid remainder are mixed in the mixer to a homogeneous dispersion of solid particles in condensate. The homogeneous mixture is poured out into containers.

EXAMPLE 1

1000 kilograms of waste rubber 3 is loaded into reactor 1 through lock hatch 2. Simultaneously, superheated water vapor having T=400° C. is transported from steam generator 4 to reactor 1 through tap 5 and consumption indicator 6. Vapor pressure in reactor 1 is controlled by manometer 7 (the pressure kept is $10^5$ Pascal). The amount of water vapor to be transported to reactor 1 in order to heat 1000 kg of waste rubber to the temperature of the beginning of pyrolysis is 1100 kg.

The temperature in the reactor is controlled by indication of thermometer 8. When waste rubber is heated up to 400° C., the process of thermal decomposition of waste with isolation of gaseous products begins. Gaseous products of pyrolysis in mixture with water vapor condense in condenser 9, which is cooled by water.

Let the amount of gaseous products, isolated during decomposition of waste rubber, be 40 mass percent, from which 25% condense and 15% are incondensable gases.

Thus, 1100 kg of water vapor and 250 kg of the products of pyrolysis condense, i.e. 1100 kg+250 kg=1350 kg of condensate are formed. Incondensable gases (150 kg) go through tap 1 and consumption indicator 11 are transported for burning to combustion chamber of steam generator 4. Let specific heat of combustion of gases be 30 megajoules/kg. It makes it possible to get 4500 megajoules after combustion of 150 kg of vapor. To obtain 1100 kg of vapor, it is necessary to use 3733 megajoules. Let the losses during formation of superheated vapor be 15%, then the amount of heat needed is 4293.64 megajoules.

Thus, heat from combustion of 150 kg of gas (4500 megajoules) is sufficient for obtaining the required amount of superheated water vapor. Condensate from condenser 9 is poured out into storage chamber 12.

After thermal decomposition waste rubber 3, the solid remainder is transported by screw 13, rotated by engine 14 to mill 15 for grinding. Solid remainder is reduced to particles with diameters of 0.001–0.210 mm due to grinding and sifting through a sieve with openings 0.210 mm. After grinding solid remainder goes to weight doser 16 where it is weighed. In our case the weight of solid remainder is 600 kg. After weighing the remainder is transported to mixer 18 through lock 17. Condensate from storage chamber 12 is transported to mixer through consumption indicator 19 and tap 20. In our case the amount of condensate is 1350 kg. Liquid and solid phases are mixed in the mixer to homogeneous mass. In this case quantitative content of solid remainder is 30.7%.

Ready mixture is poured out into containers.

EXAMPLE 2

300 kg of waste rubber are loaded into reactor 1 through lock hatch 2. Simultaneously, superheated water vapor having T=1600° C. is transported from steam generator 4 to reactor 1 through tap 5 and consumption indicator 6. Vapor pressure in reactor 1 is controlled by indication of manometer 7.

The amount of water vapor to be transported to reactor 1 in order to heat 300 kg of waste to 500° C. is 55 kg, that is 18% of the mass of waste, subject to pyrolysis.

The temperature in reactor 1 is controlled by indication of thermometer 8.

Gaseous products of pyrolysis in mixture with water vapor condense in condenser 9. Let the amount of gaseous products, isolated during decomposition of this waste rubber be 37 mass percent from which 32% condense and 5% are incondensable gases. Thus, 96 kg of the products of pyrolysis and 55 kg of water vapor condense, making 151 kg of condensate.

Incondensable gases (15 kg) through tap 10 and consumption indicator 11 are transported for burning to combustion chamber of steam generator 4. If specific heat of combustion is 30 megajoules/kg, combustion of 15 kg of gas will give the following amount of heat: 30 megajoules ×15 kg=450 megajoules. At the same time for obtaining 55 kg of vapor with T=1600° C. it is necessary to use 310 megajoules taking into account 15% of heat loss, the amount of necessary heat will be 356.5 megajoules, i.e. the heat from combustion of 15 kg of gas (450 megajoules) is sufficient for obtaining superheated water vapor.

Condensate from condenser 9 is poured out into storage chamber 12.

After thermal decomposition of waste rubber 3 the solid remainder is transported by screw 13, rotated by engine 14, to mill 15 for grinding. The solid remainder is reduced to particles with diameters ranging from 0.001 to 0.210 mm. After grinding the solid remainder goes to weight doser 16 where it is weighed. In our case the weight of solid remainder is 189 kg. After weighing the remainder is transported to mixer 18 through lock 17.

Condensate from storage chamber 12 is transported to mixer through consumption indicator 19 and tap 20. In our case the amount of condensate is: 96 kg+55 kg=151 kg. Liquid and solid phases are mixed in mixer to homogeneous mass. In this case quantitative content of solid remainder in the mixture is 55.6%.

Ready mixture is poured out into containers.

APPLICATION IN INDUSTRY

Thus, obtaining liquid fuel from waste rubber according to the present method makes it possible (in comparison with the best known analogues and prototype) to reduce power consumption and lower the amount of harmful outflow into the surroundings because the gases formed are used as power supply of the process of obtaining fuel, hence extra power sources are not needed. Lowering the temperature of process from 500°–700° C. to 400°–500° C. also makes it possible to save energy.

Besides, the composition of the fuel obtained provides high ecology not only in the process of obtaining fuel, but during combustion of liquid fuel obtained according to this method, reduction of 20–50% of harmful outflow of nitric oxides into surroundings is reached due to the balanced composition and presence of optimum quantity of water in the fuel.

What is claimed is:

1. A method for processing waste rubber comprising:
   a) pyrolyzing waste rubber at a temperature of 400° C. to 500° C. using superheated water vapor to obtain solids, gases of decomposition and water vapor, wherein the amount of superheated water vapor is 18–110% of the mass of waste rubber to be pyrolyzed;
   b) separating the solids of step a), and grinding the solids to particles of 0.001 mm to 0.210 mm;
   c) condensing the gases of decomposition and water vapor of step a) to obtain liquid, and incondensable gas;
   d) burning the incondensable gas to maintain the pyrolysis of step a); and
   e) mixing the liquid formed in step c) with 23.0 to 55.8 mass percent of the ground solid phase of step b).

* * * * *